United States Patent [19]

Kogane

[11] Patent Number: 4,697,918

[45] Date of Patent: Oct. 6, 1987

[54] PHOTOGRAPHIC PAPER ACCOMMODATING APPARATUS

[75] Inventor: Mikio Kogane, Kanagawa, Japan

[73] Assignee: Fuji Photo Film Co., Ltd., Kanagawa, Japan

[21] Appl. No.: 925,056

[22] Filed: Oct. 30, 1986

[30] Foreign Application Priority Data

Oct. 30, 1985 [JP] Japan ............................... 60-243690

[51] Int. Cl.[4] ............................................ G03B 27/32

[52] U.S. Cl. ....................................... 355/27; 355/28; 355/29

[58] Field of Search ............................. 355/28, 29, 27

[56] References Cited

U.S. PATENT DOCUMENTS 3,987,465 10/1976 Sippel .................................. 355/27

4,429,988 2/1984 Okabe .................................. 355/29

*Primary Examiner*—Monroe H. Hayes

*Attorney, Agent, or Firm*—Sughrue, Mion, Zinn, Macpeak & Seas

[57] ABSTRACT

A photographic paper accommodating apparatus which is disposed on the downstream side of a printing section for transporting an exposed continuous photographic paper to a subsequent step. A pair of first clamping and transporting rollers are disposed on the downstream side of the printing section so as to clamp and transport the photographic paper and form a first loop of the photographic paper between the printing section and the rollers. A pair of second clamping and transporting rollers are disposed on the downstream side of the first clamping and transporting rollers so as to clamp and transport the photographic paper and form a second loop of the photographic paper between the first and second clamping and transporting rollers. Either one of the first clamping and transporting rollers supports a guide member in such a manner that the guide member is movable between a first position at which the guide member guides the photographic paper toward the first clamping and transporting rollers, and a second position at which the guide member guides the photographic paper toward the second clamping and transporting rollers. The apparatus is further provided with a first sensor for detecting whether or not the leading end of the photographic paper has been clamped by the first clamping and transporting rollers, and a second sensor for detecting whether or not the trailing end of the photographic paper has been delivered from the first clamping and transporting rollers. Accordingly, it is possible to maintain normal transport of the photographic paper from the printing section to the subsequent step.

19 Claims, 9 Drawing Figures

PHOTOGRAPHIC PAPER ACCOMMODATING APPARATUS

BACKGROUND OF THE INVENTION

1. Field of the Invention

The present invention relates to a photographic paper accommodating apparatus for advancing forward a continuous photographic paper having been subjected to printing to a subsequent step in which the paper is processed by, for example, a developing machine.

2. Description of the Prior Art

One type of photographic printer is arranged such that a developing machine is dispposed on the downstream side of a printing section where the image of a negative film is printed on a photographic paper by light exposure, so as to continuously develop the exposed photographic paper. This type of photographic printer needs a photographic paper accommodating apparatus between the printing section and the developing machine for the purpose of absorbing a difference between the photographic paper feed rate at the printing section and that at the developing machine.

In one type of conventional photographic paper accommodating apparatus, the portion of the continuous photographic paper delivered thereto at a relatively high feed rate from the printing section is temporarily accommodated in the form of a loop, thereby allowing absorption of the feed rate difference between the printing section and the developing machine where the photographic paper is processed at relatively low speed.

In this type of accommodating apparatus, when the exposure operation at the printing section is to be temporarily suspended, the intermediate portion of the continuous photographic paper is cut by means of a cutter disposed between the accommodating apparatus and the developing machine, thereby allowing the portion of the photographic paper in the developing machine to move freely. In this way, it is possible when resuming the exposure operation at the printing section to immediately start the operation, and the portion of the photographic paper already accommodated in the form of a loop can be successively advanced to the developing machine. The accommodating apparatus has another cutter disposed between the apparatus and the printing section, so that when the printing operation is to be finished, the intermediate portion of the photographic paper is cut by this cutter, thereby allowing all of the exposed portion of the photographic paper to be developed without wastefully developing any portion of the photographic paper which need not be developed.

Accordingly, this type of conventional photographic paper accommodating apparatus needs two cutters respectively disposed between the apparatus and the developing machine and between the apparatus and the printing section, which means that the maintenance of the apparatus is complicated.

Further, when the photographic paper is cut by the cutter disposed between the printing section and the accommodating apparatus for the purpose of finishing the exposure operation at the printing section, it is not possible to immediately resume the operation when required for any reason, since the photographic paper cannot be advanced to the accommodating apparatus until all the portion of the paper accommodated in the looping area of the apparatus has been fed to the developing machine.

SUMMARY OF THE INVENTION

In view of the above-described circumstances, it is a primary object of the present invention to provide a photographic paper accommodating apparatus which has a reduced number of required cutters and enables the exposure operation at the printing section to be resumed even when it has been suspended immediately prior thereto and which further permits normal transport of photographic paper to be maintained.

To this end, the present invention provides a photographic paper accommodating apparatus which is disposed on the downstream side of a printing section for transporting an exposed continuous photographic paper to a subsequent step, comprising: first clamping and transporting roller means disposed on the downstream side of the printing section so as to clamp and transport the photographic paper and form a first loop of the photographic paper between the printing section and the roller means; second clamping and transporting roller means disposed on the downstream side of the first clamping and transporting roller means so as to clamp and transport the photographic paper and form a second loop of the photographic paper between the first and second clamping and transporting roller means; a guide member movable between a first position at which the guide member guides the photographic paper toward the first clamping and transporting roller means, and a second position at which the guide member guides the photographic paper toward the second clamping and transporting roller means; first sensor means for detecting whether or not the leading end of the photographic paper has been clamped by the first clamping and transporting roller means; and second sensor means for detecting whether or not the trailing end of the photographic paper has been delivered from the first clamping and transporting roller means.

By virtue of the above arrangement of the present invention, when the exposure operation at the printing section is to be temporarily suspended, the intermediate portion of the photographic paper is cut by a cutter disposed between the printing section and the accommodating apparatus, thereby allowing the developing operation to be continued. When the exposure operation is to be resumed, the guide member is moved from the second position so as to open the second looping area and allow the loop of the photographic paper in the first looping area to move to the second looping area. The guide member is then moved to the first position so that the leading end portion of the photographic paper which has been cut and newly advanced forward is guided to the first clamping and transporting roller means. Then, the guide member is further moved from the first position so as to open the first looping area, thereby allowing the photographic paper to form a loop in the first looping area.

Accordingly, it is not necessary to provide another cutter between the accommodating apparatus and the developing machine. In addition, a plurality of loops of the photographic paper are formed by enabling the conventionally disposed guide member to move between the first and second positions, thereby allowing the exposure operation at the printing section to be resumed even when it has been suspended immediately prior thereto.

In addition, the present invention employs the first and second sensor means to detect the leading and trailing ends, respectively, of the photographic paper at the first clamping and transporting roller means, so that it is possible to maintain normal transport of the photographic paper. Even when the trailing end portion of the photographic paper remains in contact with the first clamping and transporting roller means due to the frictional force occurring between the same and the roller means, the second sensor means is able to detect whether or not the photographic paper has passed the first clamping and transporting roller means. It is therefore possible to reliably move the guide member.

DETAILED DESCRIPTION OF THE PREFERRED EMBODIMENT

Figure 1:
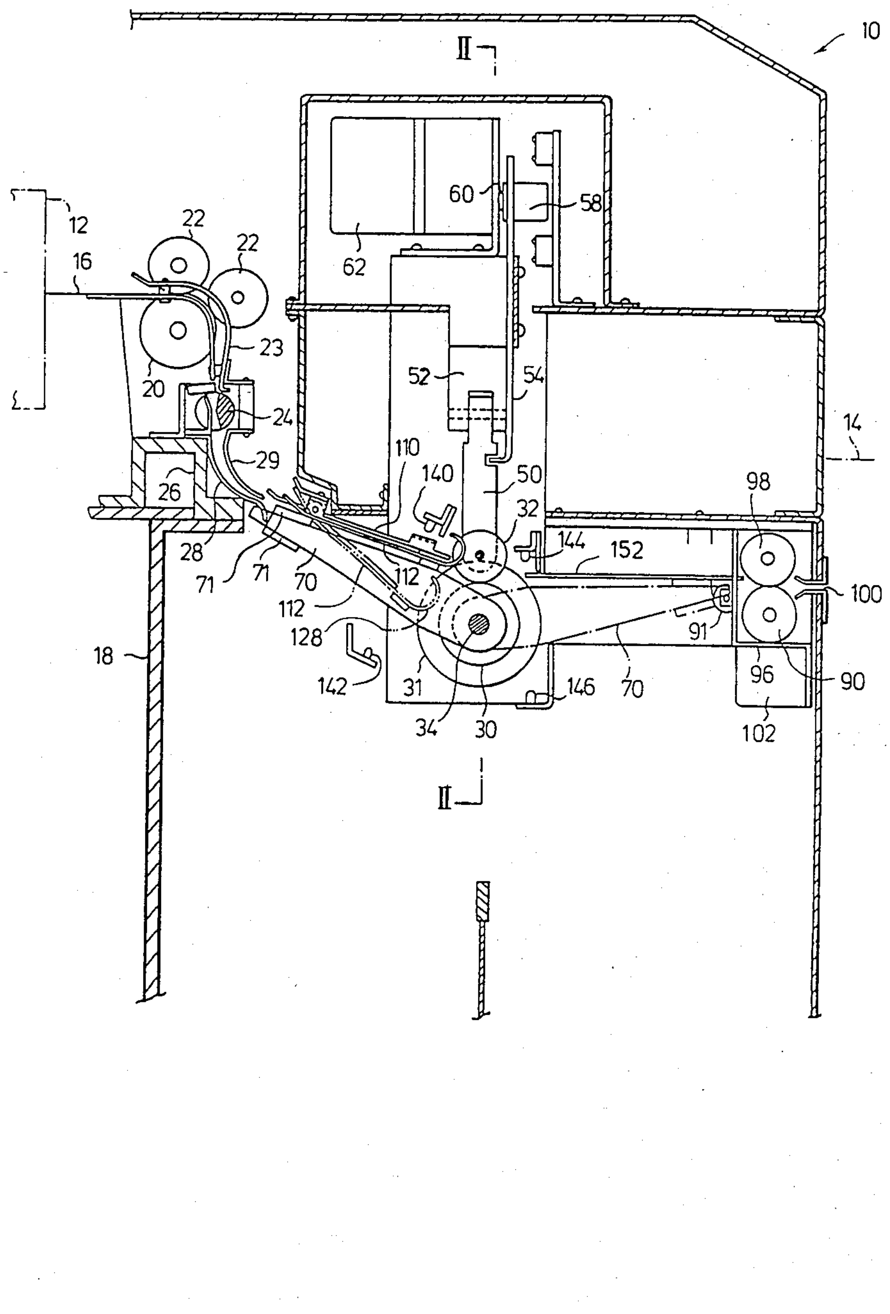
FIG. 1 is a sectional view of one embodiment of the photographic paper accommodating apparatus according to the present invention.
Figure 2:
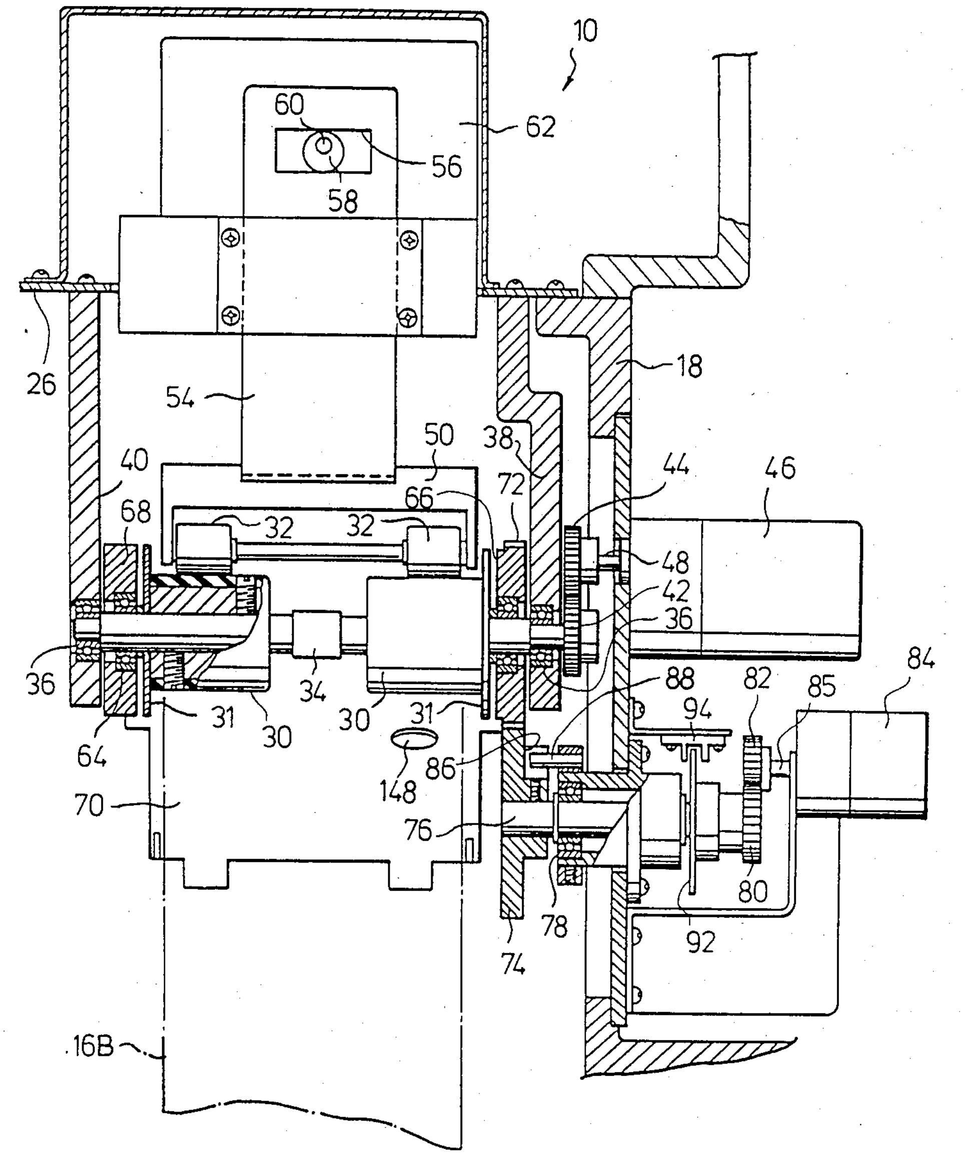
FIG. 2 is a sectional view taken along the line II—II in FIG. 1.

FIGS. 1 and 2 show a photographic paper accommodating apparatus 10 in accordance with one embodiment of the present invention. The apparatus 10 is disposed between a printing section 12 and a developing section 14 so as to guide a continuous photographic paper 16 exposed in the printing section 12 to the developing section 14.

The photographic paper accommodating apparatus 10 has a machine frame 18 which is formed integrally with the machine frame of the printing section 12. A delivery roller 20 is rotatably supported by the frame 18 on the side thereof which is closer to the printing section 12, that is, on the downstream side of the section 12. The delivery roller 20 is rotated by the driving force derived from a motor (not shown) so as to feed a continuous photographic paper 16 to the accommodating apparatus 10, the paper 16 being clamped between the roller 20 and a pressure roller 22 abutting against the outer periphery of the roller 20.

A guide plate 23 and a cutter 24 are provided between the delivery roller 20 and the accommodating apparatus 10, whereby the intermediate portion of the photographic paper 16 can be cut as desired.

A bracket 26 is secured to the machine frame 18, and guide plates 28 and 29 are mounted on the bracket 26 so as to be positioned on the downstream side of the cutter 24. The guide plates 28 and 29 serve to guide the photographic paper 16 to the area between first clamping and transporting rollers 30 and 32. The roller 30 has a pair of flanges 31, which define lateral movement limit means, and a support shaft 34 integrally secured thereto. As shown in FIG. 2, the support shaft 34 has both end portions thereof rotatably supported by bearing plates 38 and 40 through bearings 36, respectively. The bearing plates 38 and 40 are suspended from the bracket 26.

A gear 42 is secured to the distal end portion of the support shaft 34 which projects from the bearing plate 38. The gear 42 is meshed with a gear 44 which is secured to the output shaft 48 of a motor 46 mounted on the machine frame 18. Thus, it is possible to transmit the rotational force from the motor 46 to the first clamping and transporting roller 30 so as to rotate it.

The first clamping and transporting roller 32 pressed against the roller 30 is rotatably supported by a bearing plate 50. The bearing plate 50 is guided by a bracket 52 secured to the bracket 26 in such a manner that the plate 50 is movable in the direction in which the roller 32 comes in and out of contact with the roller 30. The bearing plate 50 is engaged with the lower end portion of a lifting plate 54 which has a rectangular window 56 formed in its upper end portion, as shown in FIG. 2. An eccentric cam 58 is received in the window 56. The cam 58 has an eccentric shaft 60 which is defined by the output shaft of a motor 62 supported by the bracket 26.

Accordingly, as the motor 62 rotates, the lifting plate 54 moves vertically, thus enabling the roller 32 to come in and out of contact with the roller 30.

As shown in FIG. 2, rotary plates 66 and 68 are rotatably supported on the support shaft 34 of the first clamping and transporting roller 30 through respective bearings 64, the plates 66 and 68 being respectively disposed between the roller 30 and the bearing plate 38 and between the roller 30 and the bearing plate 40. Side edges at one end of a flap 70 which defines a guide member are respectively secured to the rotary plates 66 and 68.

The rotary plate 66 is formed on its outer periphery with a gear 72 which is meshed with a gear 74. The shaft 76 of the gear 74 is rotatably supported by the machine frame 18 through a bearing 78. A gear 80 is secured to the distal end portion of the shaft 76 which projects from the frame 18, and is meshed with a gear 82. The gear 82 is secured to the output shaft 85 of a motor 84 which is mounted on the frame 18. Accordingly, the flap 70 can be pivoted by the driving force derived from the motor 84.

As shown in FIG. 2, the gear 74 has a recess 86 formed in a portion thereof, and a limit pin 88 projecting from the frame 18 extends into the recess 86 so as to limit the rotational angle of the flap 70. The rotational angle of the flap 70 ranges, as shown in FIG. 1, between a first position at which the flap 70 is stretched between the guide plate 28 and the first clamping and transporting roller 30 and a second position at which the flap 70 is stretched between the roller 30 and a second clamping and transporting roller 90. The rotational position of the flap 70 is controlled by detecting the rotational angle of a rotary plate 92 secured to the shaft 76 by means of a sensor 94, as shown in FIG. 2.

Figure 5:
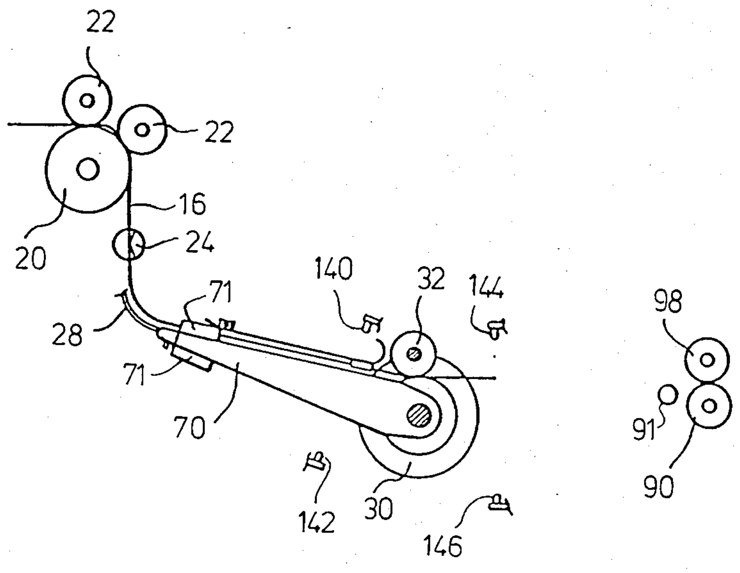
FIGS. 5(A) to 5(E) show the guide member illustrated in FIG. 1 in various operative states, respectively.
Figure 5:
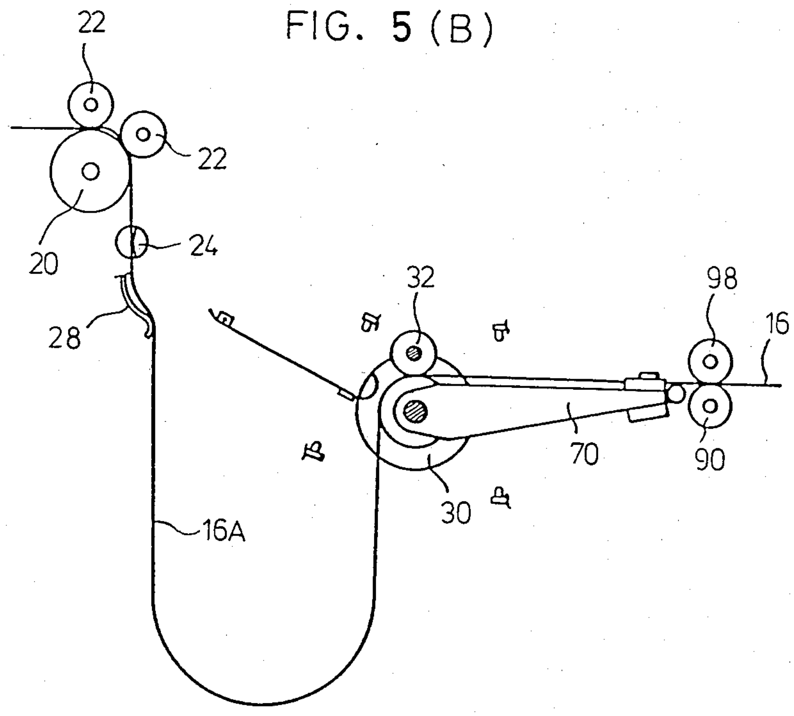
Figure 5:
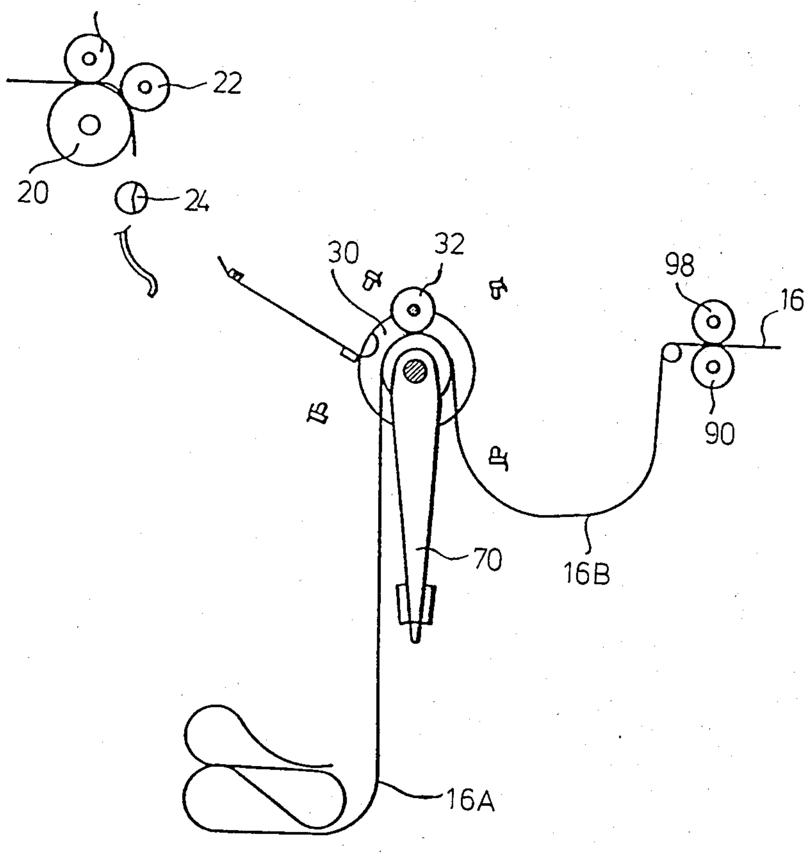

When the flap 70 lies between the second position and the vertically downward position, it is possible for a first loop 16A of the photographic paper 16 to be formed between the delivery roller 20 and the first clamping and transporting roller 30 as shown in FIG. 5(B); when the flap 70 lies between the first position and the vertically downward position, it is possible for a second loop 16B to be formed between the first and second clamping and transporting rollers 30 and 90 as shown in FIG. 5(C).

As shown in FIG. 1, the second clamping and transporting roller 90 is rotatably supported by the machine frame 18 through a bracket 96, and a second clamping and transporting roller 98 is disposed so as to abut against the roller 90. Accordingly, when the flap 70 reaches the second position as shown by the imaginary line in FIG. 1 at which the distal end of the flap 70 is directed to the second clamping and transporting rollers 90 and 98, the second clamping and transporting rollers 90 and 98 clamp the leading end portion of the photographic paper 16 guided by the flap 70 and advance it to the developing section 14 through a slit 100. For this purpose, the rotational force derived from a motor 102 is transmitted to the roller 90.

A guide plate 106 is disposed at the second position of the flap 70 in such a manner as to extend above and along the passing photographic paper 16, whereby the paper 16 is smoothly guided to the second clamping and transporting rollers 90 and 98.

Figure 3:
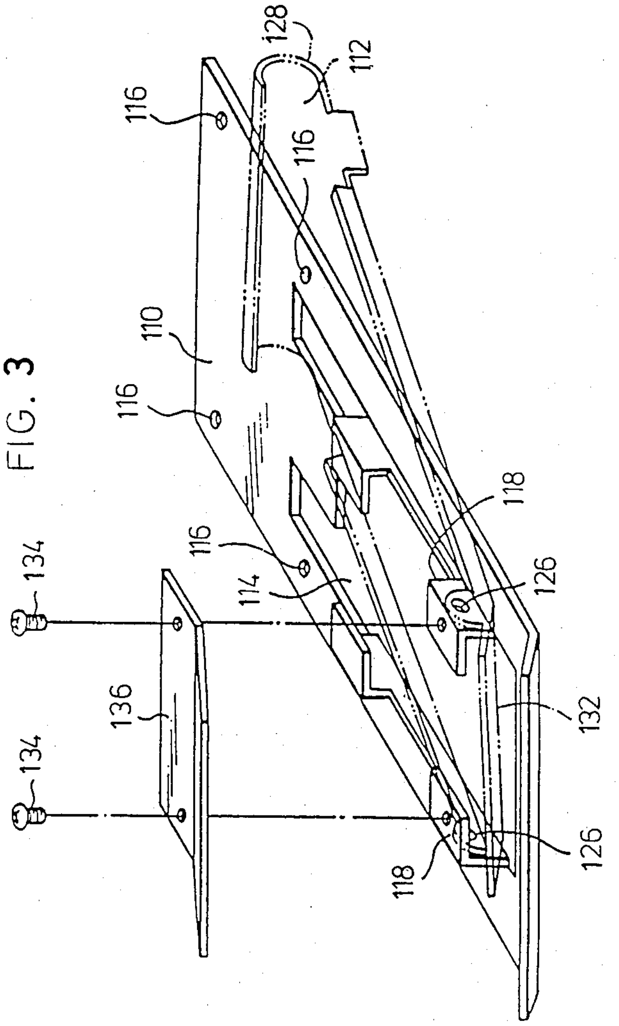
FIG. 3 is a perspective view of a bracket employed to secure the auxiliary flap.
Figure 4:
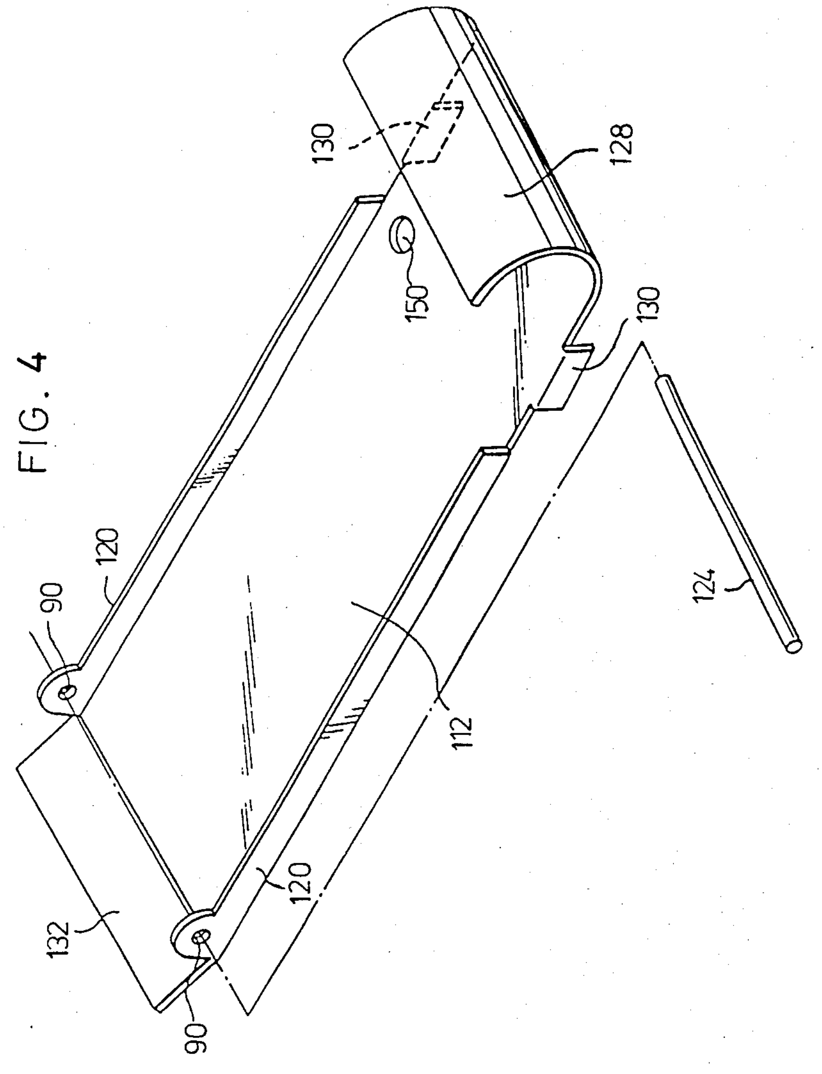
FIG. 4 is a perspective view of the auxiliary flap.

A bracket 110 is rigidly secured to the machine frame 18 in such a manner as to be disposed between the printing section 12 and the first clamping and transporting roller 30, and an auxiliary flap 112 is secured to the bracket 110. As shown in FIG. 3, the bracket 110 is formed from a thin-walled steel material which has a relatively large opening 114 provided in the center thereof, together with screw receiving bores 116 provided around the opening 114. Thus, the bracket 110 can be rigidly secured to the machine frame 18 using the screw receiving bores 116.

A pair of L-shaped projecting pieces 118 are provided on a portion of the bracket 110 on the side thereof which is closer to the printing section 12. A pair of guide projections 120 respectively project from both the lateral edges of the auxiliary flap 112, these guide projections 120 defining limit means for limiting the lateral movement of the photographic paper 16. The guide projections 120 are disposed in such a manner that one end of each guide projection 120 opposes the corresponding L-shaped projecting piece 118. A bore 90 having a circular cross-section is formed in said end of each guide projection 120, and a pivot pin 124 extends through the bores 90. Thus, the auxiliary flap 112 is supported through the pin 124 in such a manner that the flap 112 is pivotal in the area between the printing section 12 and the first clamping and transporting roller 30.

One end portion of the auxiliary flap 112 which faces the first clamping and transporting roller 30 is curved such as to have a semi-circular cross-section, thereby providing a guide portion 128. Projecting pieces 130 project from both edges of a portion of the flap 112 which is close to the guide portion 128, the pieces 130 extending in the direction opposite to that in which the guide projections 120 project, so that the projecting pieces 130 can be contacted by the flap 70. More specifically, when the flap 70 is moved to the first position at which the distal end of the flap 70 is close to the guide plate 28, the flap 70 comes in contact with the projecting pieces 130, thus causing the auxiliary flap 112 to be pushed up to reach the solid line position shown in FIG. 1. In this position, the auxiliary flap 112 cooperates with the flap 70 to define a guide passage for guiding the photographic paper 16 from the printing section 12 to the first clamping and transporting roller 30. The height of this guide passage is determined by the amount by which the projecting pieces 130 project from the auxiliary flap 112.

The projecting pieces 130 further serve to limit the lateral movement of the passing photographic paper 16 in cooperation with projecting pieces 71 which respectively project from both lateral edges of the flap 70.

When the flap 70 is moved from the first position and suspended vertically downward, the auxiliary flap 112 is allowed to pivot about the pin 124 gravitationally until it reaches the imaginary line position shown in FIG. 1.

In this position, a stopper piece 132 which is formed at that end of the auxiliary flap 112 which is opposite to the guide portion 128 abuts against a stopper piece 136 which is rigidly secured to the L-shaped projecting pieces 118 of the bracket 110 by screws 134, thus preventing the auxiliary flap 112 from rotating furthermore. When the auxiliary flap 112 reaches the maximumly lowered position, the guide portion 128 covers the area between the first clamping and transporting rollers 30 and 32. More specifically, the auxiliary flap 112 is disposed in such a manner as to lie across the photographic paper transport passage defined between the pair of guide plates 28, 29 and the first clamping and transporting rollers 30, 32, so that, when the trailing end of a portion of the photographic paper 16 which defines the first loop comes out of the area between the guide plates 28 and 29, this trailing end portion is prevented by virtue of the auxiliary flap 112 from accidentally entering the area between the first clamping and transporting rollers 30 and 32 due to the rigidity of the photographic paper 16.

Sensor means 140 and 142 are disposed on the upstream side of the first clamping and transporting rollers 30 and 32 in order to detect whether or not the trailing end portion of the photographic paper 16 being moved from the printing section 12 has reached the first clamping and transporting rollers 30, 32. In addition, sensor means 144 and 146 are disposed on the downstream side of the first clamping and transporting rollers 30 and 32 in order to detect whether or not the leading end portion of the photographic paper 16 has been delivered from the first clamping and transporting rollers 30 and 32. These sensor means are defined by a combination of a light-emitting diode and a photodiode, and in order to allow the light from the light-emitting diode to pass through the flap 70 and the auxiliary flap 112, through-holes 148 and 150 are respectively provided in the flaps 70 and 112.

The following is a description of the operation of this embodiment.

Prior to the start of an exposure operation at the printing section 12, the flap 70 is disposed at the first position as shown by the solid line in FIG. 1. In this position, the flap 70 pushes up the auxiliary flap 112 through the projecting pieces 130 and cooperates with the auxiliary flap 112 to define a space for passing the photographic paper 16.

The leading end portion of the photographic paper 16 that has been exposed in the printing section 12 is delivered by the action of the delivery rollers 20 and 22 to reach the guide plate 28. The leading end portion of the paper 16 is advanced to the area between the first clamping and transporting rollers 30 and 32 while moving through the area between the flap 70 and the auxiliary flap 112. During this feed of the photographic paper 16, the lateral movement thereof is limited by the projecting pieces 71 formed on the flap 70 and the guide projections 120 formed on the auxiliary flap 112, and the flanges 31 formed on the first clamping and transporting roller 30 also serve to limit the lateral movement of the paper 16. Therefore, the leading end portion of the paper 16 is accurately fed to the area between the first clamping and transporting rollers 30 and 32 without any fear of the longitudinal axis of the paper 16 oscillating.

When the sensor means 144 and 146 detect the leading end of the photographic paper 16, the rotation of the motor 46 is suspended, and the movement of the leading end portion of the paper 16 is thereby stopped.

Then, the flap 70 is rotated counterclockwise as viewed in FIG. 1 so as to move to the second position, as shown in FIG. 5(B), and the auxiliary flap 112 is brought into the imaginary line position shown in FIG. 1 to cover the inlet portion of the first clamping and transporting roller 30. At the same time, the operation of the motor 46 is resumed. Since the intermediate portion of the photographic paper 16 exposed at the printing section 12 is delivered therefrom at a relatively high feed rate, the first loop 16A is formed between the guide plate 28 and the first clamping and transporting roller 30.

At the same time, the leading end portion of the photographic paper 16 fed out from the area between the first clamping and transporting rollers 30 and 32 moves on the flap 70 so as to reach the area between the second clamping and transporting rollers 90 and 98 from which it is advanced by the rotation of the motor 102 to the developing section 14 where the paper 16 is successively developed.

When the leading end portion of the photographic paper 16 has been fed out from the area between the second clamping and transporting rollers 90 and 98 by the rotation of the motor 102, the first clamping and transporting roller 32 is moved upwards by the rotation of the motor 62 so as to separate from the roller 30, so that the photographic paper 16 is advanced to the developing section 14 by the force of the motor 102 alone.

When the photographic paper 16 which is passed over the first clamping and transporting roller 30 is not subjected to the clamping force applied thereto from the first clamping and transporting roller 32, the paper 16 is apt to meander during the advancement. However, meandering of the paper 16 is prevented by virtue of the flanges 31 and the guide portion 128 of the auxiliary flap 112 which is disposed within the area between the flanges 31.

When the exposure operation at the printing section 12 is to be temporarily suspended, the intermediate portion of the photographic paper 16 is cut by using the cutter 24. Even during the suspension of the exposure operation, the exposed photographic paper 16 is gradually delivered to the developing section 14 at a relatively low feed rate, thereby allowing the developing operation to proceed.

When the trailing end portion of the thus cut photographic paper 16 is released from the guide plate 28, the trailing end portion of the paper 16 may spring back into the area between the first clamping and transporting rollers 30 and 32 due to the rigidity of the paper 16.

However, since in this embodiment the auxiliary flap 112 which has already been lowered by its own weight covers the front side of the first clamping and transporting rollers 30 and 32, there is no fear of the trailing end portion of the cut photographic paper 16 entering the area between the first clamping and transporting rollers 30 and 32.

To resume the exposure operation at the printing section 12 in a state wherein the trailing end portion of the exposed photographic paper 16 remains in the form of the first loop 16A between the guide plate 28 and the first clamping and transporting roller 30, the flap 70 is moved from the second position to the vertically downward position by driving the motor 46, as shown in FIG. 5(C). Under this state, the first clamping and transporting roller 32 is brought into contact with the roller 30, and the roller 30 is rotated by driving the motor 46. In consequence, the photographic paper 16 in the form of the first loop 16A is moved so as to form the second loop 16B.

Figure 5D:
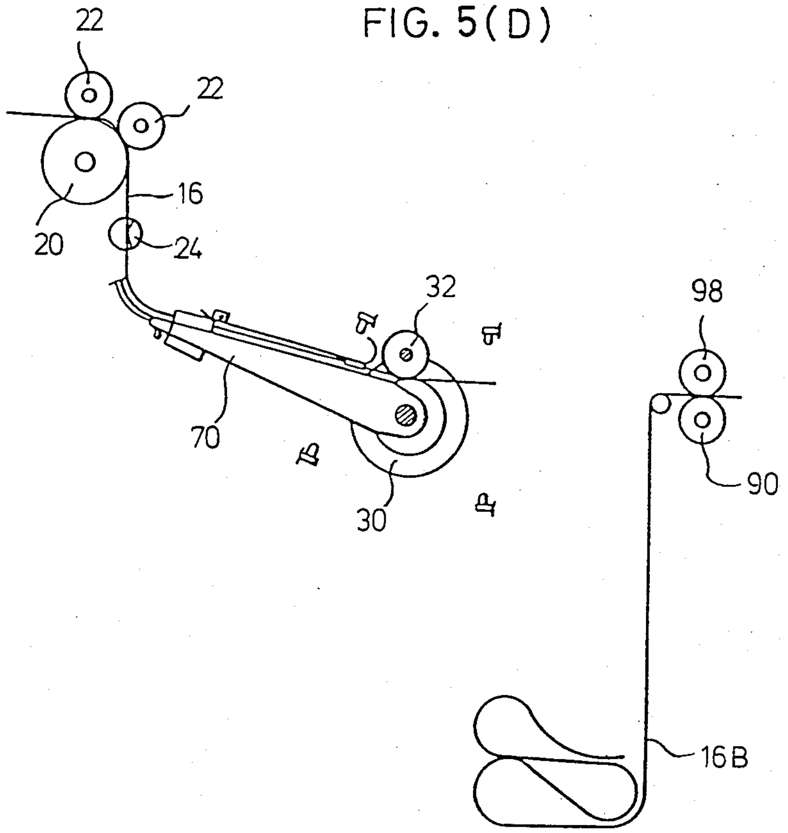
Figure 5E:
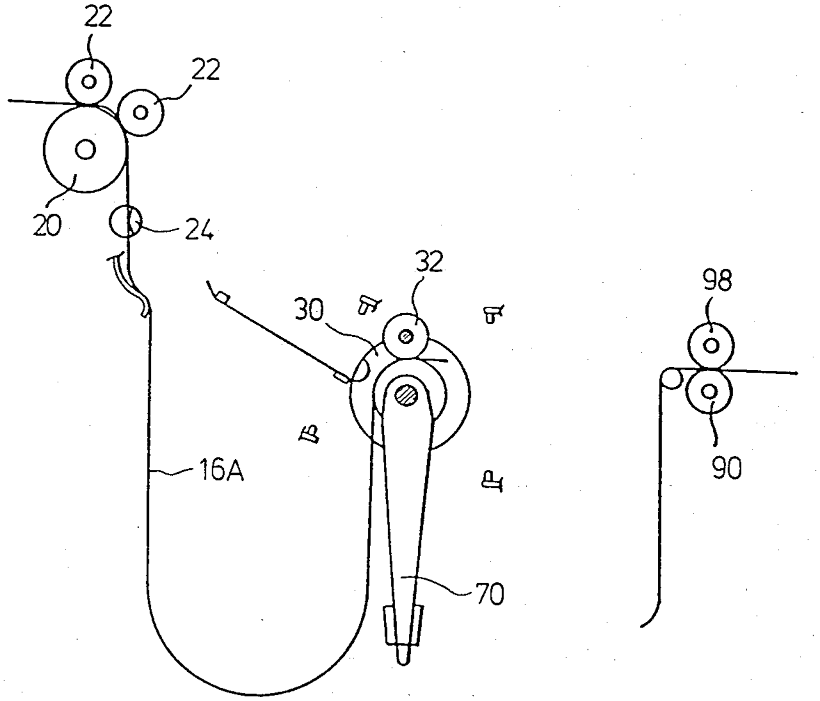

As the delivery of the photographic paper 16 by the first clamping and transporting rollers 30 and 32 further proceeds, the trailing end portion of the paper 16 is suspended down from the second clamping and transporting roller 90, as shown in FIG. 5(D). At this time, the flap 70 is moved to the first position at which it prevents the formation of the first loop 16A, and the exposure operation at the printing section 12 is then resumed.

This pivotal movement of the flap 70 is effected in response to a command for moving the flap 70 to the first position, the command being issued when the trailing end of the photographic paper 16 has passed through the area between the sensor means 144 and 146. However, there are cases where the trailing end portion of the photographic paper 16 remains in contact with the first clamping and transporting roller 30 due to the frictional force occurring between the same and the roller 30. In such cases, the sensor means 144 and 146 cannot detect the passage of the trailing end of the photographic paper 16; therefore, the flap 70 cannot be moved to the first position. However, since this embodiment has another pair of sensor means 140 and 142, if the flap 70 is turned to the first position when a predetermined period of time has elapsed after the trailing end of the photographic paper 16 has passed through the area between the sensor means 140 and 142, it is possible to reliably move the flap 70 to the first position even when the trailing end portion of the paper 16 is forced to remain on the first clamping and transporting roller 30 by the frictional force.

The provision of the sensor means 140 and 142 also serves to cope with a power failure. More specifically, the sensor means 140 and 142 enable the detection of the position of the photographic paper 16 after a power failure has been settled and the power supply has consequently been resumed.

Thus, the leading end portion of the newly exposed photographic paper 16 is advanced to the area between the first clamping and transporting rollers 30 and 32 while being guided by the flap 70. When the leading end portion of the paper 16 reaches the area between the sensor means 144 and 146, the rotation of the roller 30 is suspended again, and the flap 70 is moved from the first position and stopped at, for example, the position at which it is suspended vertically downward. As the exposure operation at the printing section 12 proceeds, the exposed portion of the photographic poaper 16 is successively accommodated in the apparatus 10 in the form of the first loop 16A.

Thus, even when the trailing end portion of the cut photographic paper 16 which has been exposed before the suspension of the exposure operation remains undeveloped in the apparatus 10, the leading end portion of the cut photographic paper 16 which is delivered after the resumption of the exposure operation can be accommodated in the first loop accommodating portion of the apparatus 10.

On the other hand, the conventional photographic paper accommodating apparatus can form only one loop of photographic paper and therefore disadvantageously needs two cutters in the front of and at the rear of the apparatus, respectively. In addition, when the loop of photographic paper formed before the suspension of the exposure operation remains in the apparatus at the time of the resumption of the operation, it is not possible to resume the exposure operation.

Although in this embodiment the auxiliary flap 112 is pivotally supported at a position near the guide plate 28, the flap 112 may be disposed near the first clamping and transporting roller 30.

As has been described above, the present invention provides a photographic paper accommodating apparatus which is disposed on the downstream side of a printing section for transporting an exposed continuous photographic paper to a subsequent step, comprising: first clamping and transporting roller means disposed on the downstream side of the printing section so as to clamp and transport the photographic paper and form a first loop of the photographic paper between the printing section and the roller means; second clamping and transporting roller means disposed on the downstream side of the first clamping and transporting roller means so as to clamp and transport the photographic paper and form a second loop of the photographic paper between the first and second clamping and transporting roller means; a guide member movable between a first position at which the guide member guides the photographic paper toward the first clamping and transporting roller means, and a second position at which the guide member guides the photographic paper toward the second clamping and transporting roller means; first sensor means for detecting whether or not the leading end of the photographic paper has been clamped by the first clamping and transporting roller means; and second sensor means for detecting whether or not the trailing end of the photographic paper has been delivered from the first clamping and transporting roller means. It is therefore possible to reduce the number of required cutters, enable the exposure operation at the printing section to be resumed even when it has been suspended immediately prior thereto, and permit normal transport of the photographic paper to be maintained.

What is claimed is:

1. A photographic paper accommodating apparatus which is disposed on the downstream side of a printing section for transporting an exposed continuous photographic paper to a subsequent step, comprising:

(a) first clamping and transporting roller means disposed on the downstream side of said printing section so as to clamp and transport said photographic paper and form a first loop of said photographic paper between said printing section and said roller means;

(b) second clamping and transporting roller means disposed on the downstream side of said first clamping and transporting roller means so as to clamp and transport said photographic paper and form a second loop of said photographic paper between said first and second clamping and transporting roller means;

(c) a guide member movable between a first position at which said guide member guides said photographic paper toward said first clamping and transporting roller means, and a second position at which said guide member guides said photographic paper toward said second clamping and transporting roller means;

(d) first sensor means for detecting whether or not the leading end of said photographic paper has been clamped by said first clamping and transporting roller means; and (e) second sensor means for detecting whether or not the trailing end of said photographic paper has been delivered from said first clamping and transporting roller means, whereby it is possible to maintain normal transport of said photographic paper from said printing section to the subsequent step.

2. A photographic paper accommodating apparatus according to claim 1, wherein said first sensor means is disposed on the downstream side of said first clamping and transporting roller means.

3. A photographic paper accommodating apparatus according to claim 2, wherein said first sensor means includes a light-emitting diode disposed on one side of a photographic paper transport passage defined between said first and second clamping and transporting roller means, and a photodiode disposed on the other side of said transport passage and adapted to receive the light emitted from said light-emitting diode.

4. A photographic paper accommodating apparatus according to claim 3, wherein said second sensor means is disposed on the upstream side of said first clamping and transporting roller means.

5. A photographic paper accommodating apparatus according to claim 4, wherein said second sensor means includes a light-emitting diode disposed on one side of a photographic paper transport passage defined between said printing section and said first clamping and transporting roller means, and a photodiode disposed on the other side of said transport passage and adapted to receive the light emitted from said light-emitting diode.

6. A photographic paper accommodating apparatus according to claim 5, further comprising an auxiliary flap disposed between said printing section and said first clamping and transporting roller means and adapted such that, when said guide member is not at said first position, said auxiliary flap covers the photographic paper inlet area of said first clamping and transporting roller means.

7. A photographic paper accommodating apparatus according to claim 6, wherein said guide member is defined by a flap which is pivotally supported by both end portions of said first clamping and transporting means in the lateral direction of said photographic paper.

8. A photographic paper accommodating apparatus according to claim 7, further comprising drive means for pivoting said flap between said first and second positions.

9. A photographic paper accommodating apparatus according to claim 8, wherein said auxiliary flap is provided with a pair of projecting pieces which are adapted such that, when said flap is at said first position, said projecting pieces abut against said flap so as to ensure the photographic paper transport passage.

10. A photographic paper accommodating apparatus according to claim 9, wherein said auxiliary flap has a through-hole for passing the light emitted from said light-emitting diode.

11. A photographic paper accommodating apparatus which is disposed on the downstream side of a printing section for transporting an exposed continuous photographic paper to a developing section along a photographic paper transport passage, comprising:

(a) a machine frame for said apparatus;

(b) a pair of first clamping and transporting rollers supported by said machine frame and disposed on the downstream side of said printing section so as to clamp and transport said photographic paper and form a first loop of said photographic paper between said printing section and said rollers;

(c) a pair of second clamping and transporting rollers supported by said machine frame and disposed on the downstream side of said first clamping and transporting rollers so as to clamp and transport said photographic paper and form a second loop of said photographic paper between said first and second clamping and transporting rollers;

(d) a flap pivotally supported by the shaft of either one of said first clamping and transporting rollers and movable between a first position at which said flap guides said photographic paper toward said first clamping and transporting rollers, and a second position at which said flap guides said photographic paper toward said second clamping and transporting rollers;

(e) means for pivoting said flap between said first and second positions;

(f) a first sensor for detecting whether or not the leading end of said photographic paper has been clamped by said first clamping and transporting rollers; and (g) a second sensor for detecting whether or not the trailing end of said photographic paper has been delivered from said first clamping and transporting rollers, whereby it is possible to maintain normal transport of said photographic paper from said printing section to the subsequent step.

12. A photographic paper accommodating apparatus according to claim 11, wherein said first sensor is disposed on the downstream side of said first clamping and transporting rollers.

13. A photographic paper accommodating apparatus according to claim 12, wherein said first sensor includes a light-emitting diode disposed on one side of the photographic paper transport passage, and a photodiode disposed on the other side of said transport passage and adapted to receive the light emitted from said light-emitting diode.

14. A photographic paper accommodating apparatus according to claim 13, wherein said second sensor is disposed on the upstream side of said first clamping and transporting rollers.

15. A photographic paper accommodating apparatus according to claim 14, wherein said second sensor includes a light-emitting diode disposed on one side of the photographic paper transport passage, and a photodiode disposed on the other side of said transport passage and adapted to receive the light emitted from said light-emitting diode.

16. A photographic paper accommodating apparatus according to claim 15, further comprising an auxiliary flap disposed between said printing section and said first clamping and transporting rollers and adapted such that, when said flap is not at said first position, said auxiliary flap covers the photographic paper inlet area of said first clamping and transporting rollers.

17. A photographic paper accommodating apparatus according to claim 16, wherein said auxiliary flap is pivotally supported by a bracket which, in turn, is supported by said machine frame.

18. A photographic paper accommodating apparatus according to claim 17, wherein said auxiliary flap is provided with a pair of projecting pieces which are adapted such that, when said flap is at said first position, said projecting pieces abut againt said flap so as to ensure the photographic paper transport passage.

19. A photographic paper accommodating apparatus according to claim 18, wherein said auxiliary flap has a through-hole for passing the light emitted from said light-emitting diode.

* * * * *